J. CAIRNS.
TIRE.
APPLICATION FILED MAR. 13, 1913.
1,091,287.
Patented Mar. 24, 1914.
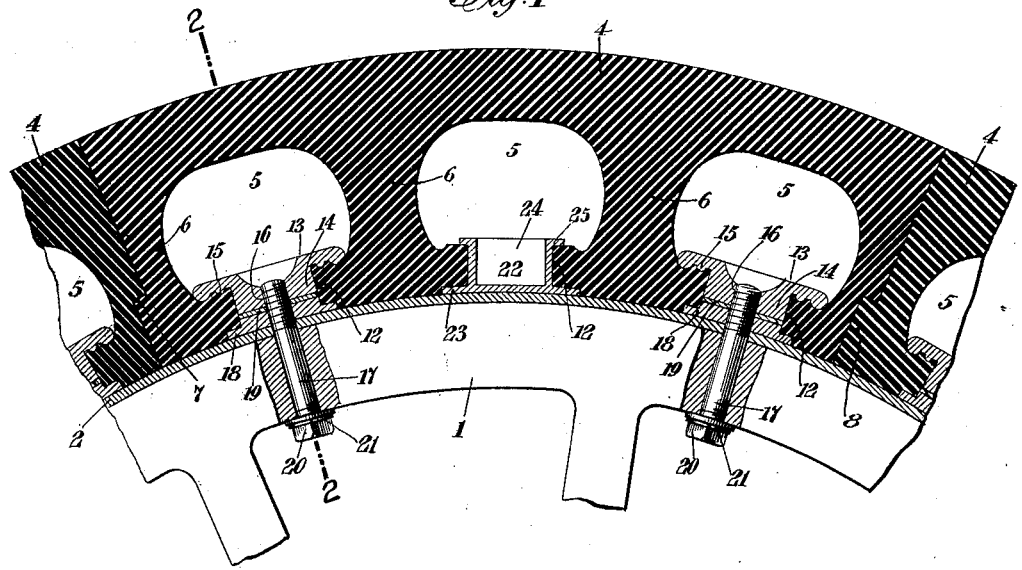
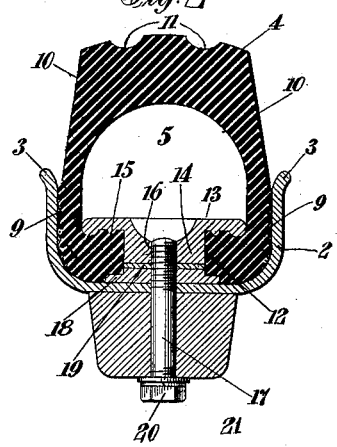
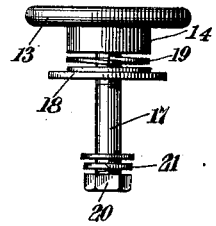
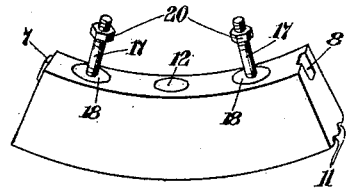
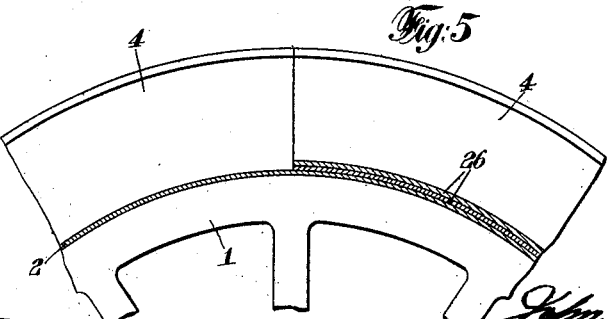
Witnesses:
Inventor
By his Attorneys
COLUMBIA PLANOGRAPH CO., WASHINGTON, D. C.

UNITED STATES PATENT OFFICE.

JOHN CAIRNS, OF WALSALL, ENGLAND.

TIRE.

1,091,287.  Specification of Letters Patent.  Patented Mar. 24, 1914.

Application filed March 13, 1913. Serial No. 753,967.

*To all whom it may concern:*

Be it known that I, JOHN CAIRNS, of Walsall, South Staffs, England, and in the Kingdom of Great Britain, have invented a certain new and useful Improvement in Tires, and do hereby declare that the following is a full, clear, and exact description thereof.

My invention relates particularly to an improvement in the type of tires known as cushion tires.

The object of my invention is to provide a cushion tire which will have an extraordinary amount of resiliency, which is readily attached in a convenient manner to the rim of the wheel, the attaching means comprising an exceedingly simple construction which is, nevertheless, entirely effective, and which is permanently locked in position once that it has been applied to the tire and to the rim of the wheel, which is made of a plurality of sections so that in case of damage to one of the sections, the section may be removed and replaced by a new section without removing the rim at any section thereof, which is so arranged that the several sections are maintained in position upon the rim and in registry with one another by an interlocking means, which is so constructed that the tire cannot, by any possibility, become rim-cut, and which is constructed so as to avoid wear due to friction between the tire and the sides of the rim retaining the same in position.

My invention is capable of embodiment in many different forms, but for the purpose of illustration I have shown only one form in the accompanying drawings, in which—

Figure 1 represents a side elevation, partly in section, of a wheel equipped with a tire made in accordance with my invention; Fig. 2 is a cross-section of the same taken on the line 2—2 of Fig. 1; Fig. 3 is a side elevation of the attaching means used for attaching the tire to the rim of the wheel; Fig. 4 is a perspective view of one of the tire sections; and, Fig. 5 is a view showing the use of spacing plates to build up a tire section.

In the drawings, 1 indicates the felly of a wheel around which is located a rim 2 made of metal. It will be noted that the outer edges of the rim 2 have flaring flanges 3 to prevent the tire from coming into contact with the curb of a sidewalk or any other projection which might damage the side of the tire were the same not protected. The tire is made up of a plurality of sections 4 having preferably a number of separate air chambers 5 which are surrounded by sustaining walls 6 of sufficient thickness to sustain a considerable load alone, apart from the sustaining effect attained by the air trapped in the air chambers 5. Each of the tire sections 4 has at one end an interlocking projection 7, and at the other end a corresponding interlocking recess 8 in order to lock the tire section to the adjacent tire sections. At either side of the tire, and adjacent to the faces thereof, there is a canvas strip or strip of other suitable material 9 which prevents the tire from wearing, owing to friction if any between the tire and the sides of the rim 2. The tire is, furthermore, constructed with inwardly inclined side faces 10 extending above the ends of the rim 2 so that when the tire is compressed, owing to the weight of the vehicle, it will not become rim-cut by overlapping the edges of the rim 2. Along the tread of the tire there is provided a number of longitudinal grooves 11 to prevent skidding. Upon the under face of the tire section there is a circular hole 12 communicating with each of the air spaces 5. In order to attach a tire section 4 to the rim 2, I insert through each of the openings, or only through the two end openings in the tire section, a clamping member or head 13 having a reduced neck 14 which fits within the hole 12 to prevent the base of the tire sections from spreading when clamped in the manner hereinafter indicated. The clamping member 13 has, furthermore, upon its under face a ridge 15 extending around the same so as to effectively grip the face of the tire. The clamping member 13 has, in addition, a central screw-threaded hole 16 to receive the end of a bolt 17. Screw-threaded to the same end of said bolt, but beneath the base of the tire section 4, there is a cover plate 18 which acts also as a clamping member in opposition to the clamping member 13. Between the two clamping members 13 and 18, I provide a split helical washer 19 to lock the clamping members so as to prevent their turning, and also to fill up the cavity around the bolt 17 between the two clamping members, so as to prevent the base of the tire section from spreading by entering the space between the two clamping members. Each of the bolts 17 extends through the rim 2 and through the felly 1, and has a nut 20 and split helical washer 21 upon its end to secure the tire section 4 to the rim 2. Both of the split washers 19 and 21 are, of course, arranged in a spiral position to cause them to exert a pressure against the adjacent parts carried by the bolts 17.

Instead of having all the openings 12 filled by a clamping member, such as the clamping member 13, I may instead use a closure 22 in all except the end air chambers 5 upon the two ends of the tire section 4. This shell 22 comprises a base plate 23, a cylindrical extension 24, and a flange 25. The extension 24 fills the opening 12, while the flange 25 overlies the bottom of the tire located at the bottom of the air chamber 5 to make a complete closure for the air chamber. When it is necessary to replace one of the tire sections, owing to damage thereto, I may either insert instead a tire section of the usual size and grind down or pare down the surface thereof to the proper thickness, or I may use instead a tire section of smaller thickness and build the same up by means of spacing plates 26, as shown in Fig. 5, until the tread of the tire section so inserted has the proper level.

In order to attach the tire to the wheel, the attaching means is first secured to the several sections by inserting the inner clamping plate or head through the opening in the bottom of the tire. The bolt carrying the lower clamping plate and the split washer is then screwed into the inner clamping plate until the tire section is firmly gripped between the two clamping plates. In this position the split washer located between the two clamping plates will be held firmly against the two clamping plates so as to lock them in position, and at the same time prevent the edges of the tire section at this point from spreading inwardly into the space between the two clamping plates. The tire section is attached to the rim and felly of the wheel by inserting the bolts through the holes provided for that purpose therein, then securing the bolts in place by means of the nuts and split washers provided beneath the nuts. It will be assumed, of course, that in case the attaching means is not applied to all of the air cavities in the tire, the cavities to which they are not applied will be closed by the special closing plates used for this purpose.

The tire is completely built up by adding enough of the tire sections to the rim of the wheel until the completed tire is in place. The several sections will be retained in place not only because of the rim and the attaching means for securing the same thereto, but also because of the interlocking projections and recesses carried upon the ends of the respective tire sections. In the use of the tire, the projecting flanges on the two sides of the rim will prevent the sides of the tire from being damaged by contact with the curbs of sidewalks or other similar projections that might come into contact with the side of the tire were these flanges not present. Furthermore, the inclined side faces of the tire will prevent the tire from becoming rim-cut by extending over the sides of the rim when the tire is under compression, due to the weight of the vehicle. It will be noted that in the use of the tire the inclosing walls of the several air chambers in the tire will themselves support a considerable load, but in addition to this, the compressed air in the several air chambers will also support a very important portion of the load, inasmuch as the air therein is permanently trapped against any escape or leakage. Furthermore, the air is trapped by the same means which is used for attaching the tire sections to the wheel, thus permitting the use of an exceedingly simple construction having an extremely small number of parts. In case one of the tire sections should become damaged, the same may be readily removed while the vehicle is on the road, merely by loosening the fastening means and inserting in place of the damaged tire section, a new section of the tire. In case the new tire section is too thick, the tread thereof may be readily ground down or pared down to the proper level, or instead there may be used a tire section having a small thickness which may be built up to the right level by inserting spacing plates beneath the tire section.

While I have described my invention above in detail, I wish it to be understood that many changes may be made therein without departing from the spirit thereof.

I claim:

In a resilient tire, the combination of a tire section having a chamber therein and having an opening through the base thereof, a fastening member having a head resting upon said base and a shank extending within said opening, a clamping plate engaging the outer surface of said base and closing said opening, a bolt threaded through said parts, and a helical washer located between the said fastening member and said clamping plate and locking said parts from independent rotation, substantially as described.

In testimony that I claim the foregoing I have hereunto set my hand.

JOHN CAIRNS.

Witnesses:
 ELBRIDGE F. HILLS,
 ALBERT E. INSHAW.

---

Copies of this patent may be obtained for five cents each, by addressing the "Commissioner of Patents, Washington, D. C."